(12) United States Patent
Li

(10) Patent No.: US 10,409,111 B2
(45) Date of Patent: Sep. 10, 2019

(54) LIQUID CRYSTAL DISPLAY DEVICE, LIQUID CRYSTAL DISPLAY MODULE AND LIQUID CRYSTAL CELL THEREOF

(71) Applicant: Shenzhen China Star Optoelectronics Technology Co., Ltd., Shenzhen, Guangdong (CN)

(72) Inventor: Dongze Li, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 476 days.

(21) Appl. No.: 15/104,259

(22) PCT Filed: May 20, 2016

(86) PCT No.: PCT/CN2016/082809
§ 371 (c)(1),
(2) Date: Jun. 14, 2016

(87) PCT Pub. No.: WO2017/190375
PCT Pub. Date: Nov. 9, 2017

(65) Prior Publication Data
US 2018/0101031 A1    Apr. 12, 2018

(30) Foreign Application Priority Data
May 4, 2016 (CN) .......................... 2016 1 0292369

(51) Int. Cl.
*G02F 1/1337* (2006.01)
*G02F 1/13* (2006.01)
(Continued)

(52) U.S. Cl.
CPC ............ *G02F 1/1337* (2013.01); *B29C 59/02* (2013.01); *G02F 1/017* (2013.01); *G02F 1/13* (2013.01);
(Continued)

(58) Field of Classification Search
CPC ........ G02F 1/3532; G02F 1/133; G02F 1/017; G02F 1/13; G02F 2001/01791; G02F 2202/36; Y10T 428/10; Y10T 428/1005
See application file for complete search history.

(56) References Cited

U.S. PATENT DOCUMENTS

2010/0208172 A1   8/2010  Jang et al.
2010/0302470 A1*  12/2010 Hegmann .............. C09K 19/52
                                                    349/33
(Continued)

FOREIGN PATENT DOCUMENTS

CN          104698682 A      6/2015
CN          105097879 A      11/2015
WO     WO-2014073893 A1 *   5/2014   ........... C09K 11/025

*Primary Examiner* — Sophie Hon
(74) *Attorney, Agent, or Firm* — Andrew C. Cheng

(57) ABSTRACT

The invention provides a liquid crystal display device, a liquid crystal display module and a liquid crystal cell thereof. The liquid crystal cell includes an upper substrate, a lower substrate, and a mixture of a quantum dot material and a liquid crystal material disposed between the upper substrate and the lower substrate. The quantum dot material includes a red quantum dot material and a green quantum dot material. A mass ratio of a total mixing amount of the two quantum dot materials occupied in a total mass of the mixture is 0.05~5 wt %. As to the liquid crystal cell, the introduction of the QD material promotes the directional arrangement of liquid crystal molecules and thus plays a role of alignment; in another aspect, the liquid crystal cell being used in conjunction with a backlight source of blue or white LED can enhance the color gamut.

4 Claims, 2 Drawing Sheets

(51) Int. Cl.
*G02F 1/1333* (2006.01)
*G02F 1/017* (2006.01)
*G02F 1/35* (2006.01)
*B29C 59/02* (2006.01)
*H05K 5/00* (2006.01)
B29L 31/34 (2006.01)
G02F 1/1335 (2006.01)
G02F 1/137 (2006.01)

(52) U.S. Cl.
CPC .......... *G02F 1/1333* (2013.01); *G02F 1/3532* (2013.01); *H05K 5/0017* (2013.01); *B29L 2031/3475* (2013.01); *G02F 1/133617* (2013.01); *G02F 2001/01791* (2013.01); *G02F 2001/13712* (2013.01); *G02F 2202/10* (2013.01); *G02F 2202/36* (2013.01); *Y10T 428/10* (2015.01); *Y10T 428/1005* (2015.01)

(56) References Cited

U.S. PATENT DOCUMENTS

| | | | |
|---|---|---|---|
| 2011/0281388 A1 | 11/2011 | Gough et al. | |
| 2013/0120678 A1* | 5/2013 | Chao | G02F 1/01 349/34 |
| 2014/0027673 A1 | 1/2014 | Nick et al. | |
| 2014/0036203 A1* | 2/2014 | Guillou | G02F 1/133615 349/62 |
| 2015/0285444 A1* | 10/2015 | Choi | C09K 11/025 362/84 |
| 2017/0153502 A1 | 6/2017 | Wang et al. | |
| 2017/0261779 A1 | 9/2017 | Ma et al. | |

\* cited by examiner

LIQUID CRYSTAL DISPLAY DEVICE, LIQUID CRYSTAL DISPLAY MODULE AND LIQUID CRYSTAL CELL THEREOF

TECHNICAL FIELD

The invention relates to the field of liquid crystal display device, and particularly to a liquid crystal display device, a liquid crystal display module and a liquid crystal cell thereof.

DESCRIPTION OF RELATED ART

A quantum dot light-emitting material has advantages of highly concentrated emission spectrum, high color purity and so on, and therefore by using these advantages, it can greatly improve color gamut of current LCD devices and increase color reproduction capability of the LCD devices. The currently commercially available quantum dot TV is the best embodiment of the material being applied in the field of display. The prior art mainly focuses on mixing and encapsulating quantum dots with light-emitting wavelengths at R (red), G (green) and B (blue) into an engineering plastic film (also referred to as QD film) or a glass tube (also referred to as QD tube), placing the resultant QD structure at a location between a backlight and a display system, and then using the traditional white light backlight to excite it so as to achieve the purpose of enriching color gamut. However, regardless of the QD film structure or the QD tube structure, the way of using the quantum dot material is relatively simple, and meanwhile there are problems such as large QD usage amount, high cost and low material reliability. In addition, the quantum dot material is excited by the white light backlight, which would decrease the light utilization.

SUMMARY

Accordingly, embodiments of the invention provide a liquid crystal display device, a liquid crystal display module and a liquid crystal cell thereof, so as to solve technical issues of large usage amount of quantum dot material, low utilization of backlight and complex structure caused by the liquid crystal cell needs to be equipped with an alignment film and so on in the prior art.

In order to solve the above issues, an embodiment of the invention provides a liquid crystal cell. The liquid crystal includes an upper substrate, a lower substrate, and a mixture of a quantum dot material and a liquid crystal material disposed between the upper substrate and the lower substrate.

According to a preferred embodiment of the invention, the quantum dot material includes a red quantum dot material and a green quantum dot material.

According to a preferred embodiment of the invention, the green quantum dot material includes: one or more than one of $ZnCdSe_2$, InP and $Cd_2SSe$ as a light-emitting core, one or more than one of CdS, ZnSe, $ZnCdS_2$, ZnS and ZnO as an inorganic protective shell, and one or more than one of R—COOH, R—$NH_2$ and R—SH as a surface ligand, where R is a straight-chain alkane or olefin molecule containing 12~20 carbon atoms.

According to a preferred embodiment of the invention, the red quantum dot material includes: one or more than one of CdSe, Cd2SeTe and InAs as a light-emitting core, one or more than one of CdS, ZnSe, $ZnCdS_2$, ZnS and ZnO as an inorganic protective shell, and one or more than one of R—COOH, R—$NH_2$ and R—SH as a surface ligand, where R is a straight-chain alkane or olefin molecule containing 12~20 carbon atoms.

According to a preferred embodiment of the invention, a mass ratio of a total mixing amount of the two quantum dot materials occupied in a total mass of the mixture is 0.05~5 wt %.

According to a preferred embodiment of the invention, the quantum dot material and a negative liquid crystal material are mixed at a temperature above a clearing point of the liquid crystal material.

In order to solve the above issues, the invention further provides a liquid crystal display module. In particular, the liquid crystal display module includes the liquid crystal cell according to any one of the above embodiments.

According to a preferred embodiment of the invention, when the mass ratio of the mixing amount of the quantum dot material occupied in the total mass of the mixture is 0.05~2 wt %, the liquid crystal display module employs a white light backlight.

According to a preferred embodiment of the invention, when the mass ratio of the mixing amount of the quantum dot material occupied in the total mass of the mixture is 2~5 wt %, the liquid crystal display module employs a blue light backlight.

In order to solve the above issues, the invention still further provides a liquid crystal display device. In particular, the liquid crystal display device includes the liquid crystal display module according to any one of the above embodiments.

Compared with the prior art, for the liquid crystal display device, the liquid crystal display module and the liquid crystal cell thereof associated with invention, the introduction of the quantum dot material in one aspect is contributed to the directional arrangement of liquid crystal molecules, plays a role of alignment and thus can replace the traditional alignment film structure; in another aspect, the liquid crystal cell is used in conjunction with a backlight source of a blue (when the mixing amount of quantum dot material is relative large) or white LED, which can enhance the color gamut and improve the color performance of LCD devices. Moreover, in the liquid crystal cell, the quantum dots are combined with the liquid crystal system, which can help the effective use of the quantum dot material and thus can save more material and process cost compared with the conventional QD film and QD tube techniques. In addition, when the liquid crystal cell is used in conjunction with a blue light backlight, it can achieve the purpose of reducing the thickness of a color filter while without degrading display effect.

BRIEF DESCRIPTION OF THE DRAWINGS

In order to more clearly illustrate technical solutions of embodiments of the invention, drawings will be used in the description of the embodiments of the invention or the prior art will be given a brief description below. Apparently, the drawings in the following description only are some of embodiments of the invention, the ordinary skill in the art can obtain other drawings according to these illustrated drawings without creative effort.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
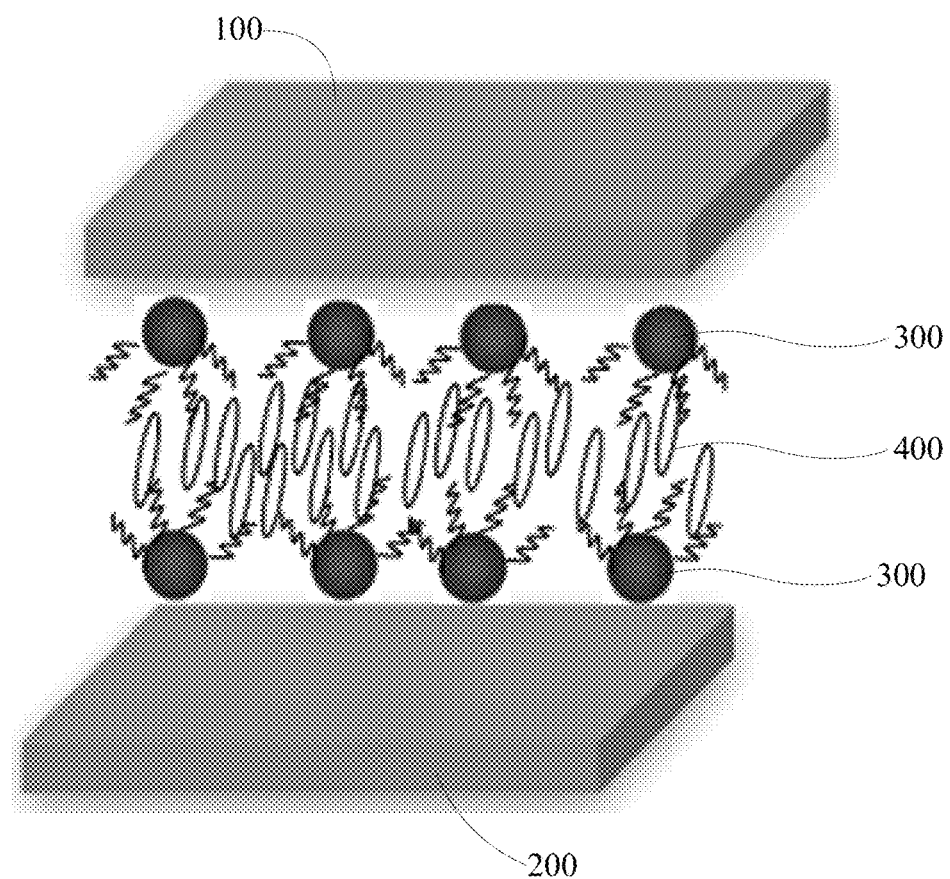
FIG. 1 is a schematic structural view of a liquid crystal cell in the situation of electrode plates being not powered according to a preferred embodiment of the invention.
Figure 2:
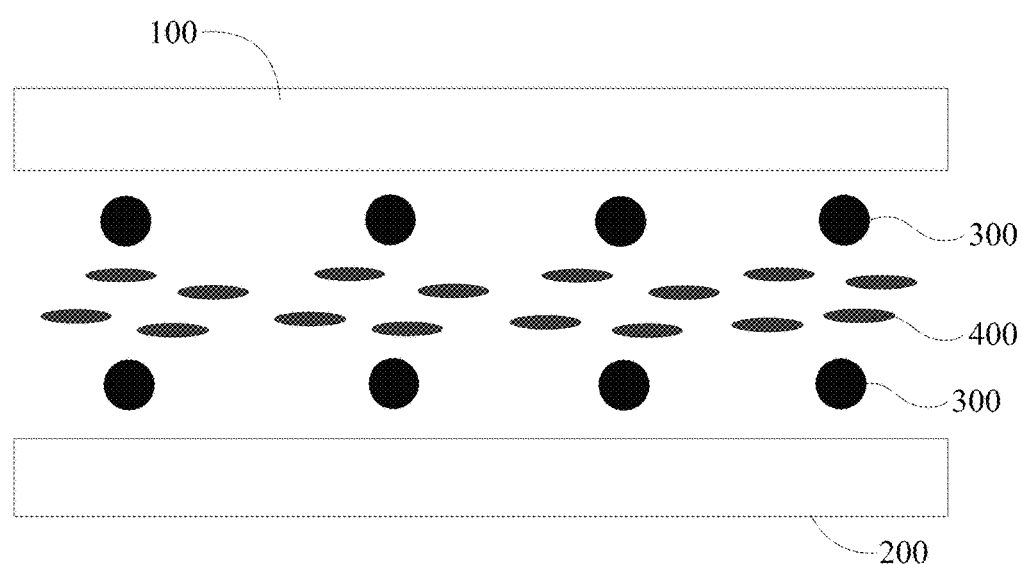
FIG. 2 is a schematic structural view of the liquid crystal cell in FIG. 1 in the situation of the electrode plates being powered.

Referring to FIG. 1 and FIG. 2 together, FIG. 1 is a schematic structural view of a liquid crystal cell of which electrode plates being not powered according to a preferred embodiment of the invention, and FIG. 2 is a schematic structural view of the liquid crystal cell in FIG. 1 of which the electrode plates being powered. The liquid crystal cell includes but is not limited to the following components that: an upper substrate 100, a lower substrate 200, and a mixture of a quantum dot material 300 and a liquid crystal material 400 disposed between the upper substrate 100 and the lower substrate 200.

Preferably, the quantum dot material 300 includes a red quantum dot material and a green quantum dot material (they are not distinguished to label in the drawings). Moreover, the green quantum dot material includes: one or more than one of $ZnCdSe_2$, InP and $Cd_2SSe$ as a light-emitting core, one or more than one of CdS, ZnSe, $ZnCdS_2$, ZnS and ZnO as an inorganic protective layer, and one or more than one of R—COOH, R—$NH_2$ and R—SH as a surface ligand, where R is a straight-chain alkane or olefin molecule containing 12~20 carbon atoms.

The red quantum dot material includes: one or more than one of CdSe, $Cd_2SeTe$ and InAs as a light-emitting core, one or more than one of CdS, ZnSe, $ZnCdS_2$, ZnS and ZnO as an inorganic protective layer, and one or more than one of R—COOH, R—$NH_2$ and R—SH as a surface ligand, where R is a straight-chain alkane or olefin molecule containing 12~20 carbon atoms. Of course, the above description only list some compositions of the quantum dot materials, the skilled person in the art can obtain other compositions under the guidance of the above listed materials.

Preferably, a mass ratio of a total mixing amount of the two (i.e., red and green) quantum dot materials occupied in a total mass of the mixture is 0.05~5 wt %.

The liquid crystal cell according to the illustrated embodiment uses the mixing of R (red) and G (green) quantum dots with fluorescent properties and the liquid crystal, exhibits a relatively steady distribution under the effect of surface ligands of the quantum dot materials and thereby realizes the application of quantum dot material in the liquid crystal cell. The technical solution has a dual functionality that the introduction of quantum dot material (hereinafter referred to as QD material) in one aspect facilitates the directional arrangement of liquid crystal molecules, plays the role of alignment and therefore can replace the traditional alignment film structure; and in another aspect the structure can be used in conjunction with the backlight of blue light or white light LED, which can enhance color gamut and improve color performance of LCD display devices. In addition, the liquid crystal cell combines the quantum dots with the liquid crystal system, which can help the effective use of the QD material and thus can save more material and process cost compared with the conventional QD film and QD tube techniques.

A QD alignment principle in the technical solution proposed by the invention is phenomenon and result of liquid crystal molecules being oriented along a same direction by introducing nanospherical quantum dot materials and using their surface effects to make van der waals forces between the liquid crystal modules and a substrate to achieve the purpose of force balancing among the liquid crystal molecules. While the QD materials play the role of alignment, because of their unique optical properties, the very narrow fluorescent peak promotes color coordinates in the color gamut triangle to be more close to respective edge positions, and therefore in the viewpoint of colorimetry, the application of QD light-emitting material would intuitively improve the situation of the color of traditional LCD display device relatively being not rich enough. The structure of quantum dot materials being mixed in the liquid crystal material of the liquid crystal cell according to the invention has an important significance for the development of high color-gamut and high color-saturation display devices.

The liquid crystal cell according to the illustrated embodiment of the invention introduces the luminescent QD material into the liquid crystal system, and a concrete preparing process thereof is as follows: firstly R, G two kinds of luminescent quantum dot materials and a negative liquid crystal are mixed at a temperature (depending on the liquid crystal material, generally is above 75° C.) above a clearing point of the liquid crystal, and a mass ratio of the total mixing amount of the two kinds of quantum dot materials occupied in the total mass of the mixture is 0.05~5 wt %.

The liquid crystal material mixed with the QD materials can be used to form a liquid crystal cell structure as shown in FIG. 1 by a vacuum infusion process or a dropping process. Since surface modifications of the quantum dot materials mainly are based on coordination effect of polar molecules, what are contacted with the liquid crystal molecules are alkane and olefin structures of the ligand portions, which overall are non-polar and similar to the polarity of the liquid crystal molecules, and therefore owing to hydrophilic and hydrophobic effects, the quantum dot materials would locate at positions near upper and lower substrate surfaces, the liquid crystal molecules arrive at the force equilibrium state and thus exhibit uniform alignment. After the above structure is applied with a driving voltage, the liquid crystal molecules thereof exhibit irregular horizontal orientation as shown in FIG. 2; and after the electric field is withdrawn, under the dual effect of intermolecular forces and Van der Wals forces, the liquid crystal molecules return to the vertical alignment again (i.e., the arrangement of liquid crystal molecules as shown in FIG. 1).

Figure 3:
FIG. 3 is a schematic structural view of a liquid crystal display module according to a preferred embodiment of the invention.

Furthermore, an embodiment of the invention further provides a liquid crystal display module. Referring to FIG. 3, which is a schematic structural view of a liquid crystal display module according to a preferred embodiment of the invention. The liquid crystal display module includes a backlight unit 666 and a liquid crystal cell 555 according to the above embodiment.

When the mass ratio of the mixing amount of the quantum dot material in the liquid crystal cell 555 of the liquid crystal display module occupied in the total mass of the mixture is 0.05~2 wt %, the liquid crystal display module uses a white light backlight; and when the mass ratio of the mixing amount of the quantum dot material occupied in the total mass of the mixture is 2~5 wt %, the liquid crystal display module uses a blue light backlight. The liquid crystal display module in the illustrated embodiment of the invention adopts different application solutions according to the difference of the mixing ratios of the quantum dot material, the traditional white light backlight is used when the mixing amount is relatively low, and when the mixing amount is relatively large, the blue light backlight is used and the thickness of the color filter (CF) can be reduced, by seeking a balance between color gamut and light transmittance, the same display effect which can meet requirement can be achieved. As to technical features associated with other parts (including polarizer, electrode and color filter, etc.) of the liquid crystal display module, which are in the scope of understanding of the skilled person in the art and thus will not be repeated herein.

Figure 4:
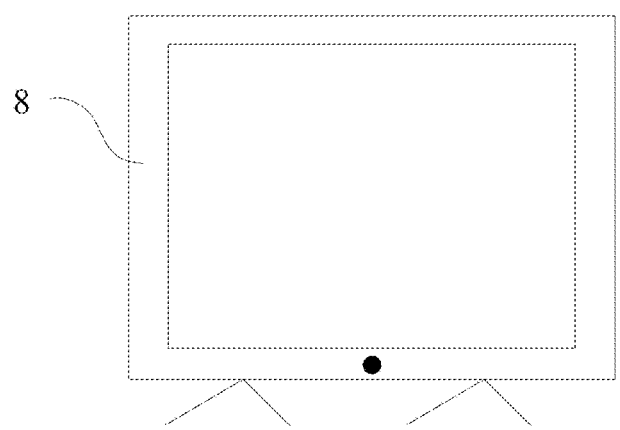
FIG. 4 is a schematic structural view of a liquid crystal display device according to a preferred embodiment of the invention.

In addition, an embodiment of the invention still further provides a liquid crystal display device. Referring to FIG. 4, which is a schematic structural view of a liquid crystal display device according to a preferred embodiment of the invention. In particular, the liquid crystal display device includes a casing 8, and the liquid crystal display module according to the above embodiment and disposed in the casing 8. As to the technical features of the liquid crystal display module, please refer to the detailed description in the above embodiment. Technical features of other parts of the liquid crystal display device are within the scope of understanding of the skilled person in the art and thus will not be repeated herein.

Compared with the prior art, as to the liquid crystal display device, the liquid crystal display module and its liquid crystal cell as provided by the invention, the introduction of QD material in one aspect facilitates the directional arrangement of liquid crystal molecules, plays a role of alignment and thus can replace the traditional alignment film structure; in another aspect, the liquid crystal cell being used in conjunction with a backlight source of blue (when the mixing amount of the quantum dot material is relatively large) or white LED can enhance color gamut and improve color performance of the LCD device. In the liquid crystal cell, the quantum dots are combined with the liquid crystal system, which can help the effective use of QD material and can save more material and process cost compared with the conventional QD film and QD tube techniques. In addition, when the liquid crystal cell is used in conjunction with the blue light backlight, which further can achieve the purpose of reducing the thickness of color filter while without degrading display effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display device, wherein the liquid crystal display device comprises a liquid crystal display module and a blue light backlight; the liquid crystal display module comprises a liquid crystal cell; the liquid crystal cell comprises an upper substrate, a lower substrate, and a mixture of a quantum dot material and a liquid crystal material comprising liquid crystal molecules disposed between the upper substrate and the lower substrate, and the liquid crystal cell does not comprise an alignment film;
 wherein the quantum dot material comprises a red quantum dot material and a green quantum dot material, and a mass ratio of a total mixing amount of the two quantum dot materials occupied in a total mass of the mixture is 2~5 wt %;
 wherein the quantum dot materials are located at positions near the upper and lower substrates' surfaces, and facilitate the directional arrangement of the liquid crystal molecules,
 where in the absence of a driving voltage, the liquid crystal molecules exhibit uniform vertical alignment, and
 with the application of a driving voltage, the liquid crystal molecules exhibit irregular horizontal alignment.

2. The liquid crystal display device as claimed in claim 1, wherein the green quantum dot material comprises: one or more than of ZnCdSe2, InP and Cd2SSe as a light-emitting core, one or more than one of CdS, ZnSe, ZnCdS2, ZnS and ZnO as an inorganic protective shell, and one or more than one of R—COOH, R—NH2 and R—SH as a surface ligand, where R is a straight-chain alkane or olefin molecule containing 12~20 carbon atoms.

3. The liquid crystal display device as claimed in claim 1, wherein the red quantum dot material comprises: one or more than one of CdSe, Cd2SeTe and InAs as a light-emitting core, one or more than one of CdS, ZnSe, ZnCdS2, ZnS and ZnO as an inorganic protective shell, and one or more than one of R—COOH, R—NH2 and R—SH as a surface ligand, where R is a straight-chain alkane or olefin molecule containing 12~20 carbon atoms.

4. The liquid crystal display device as claimed in claim 1, wherein the quantum dot material is mixed with a liquid crystal material having a negative dielectric anisotropy at a temperature above a clearing point of the liquid crustal material having a negative dielectric anisotropy.

* * * * *